United States Patent [19]

Arai

[11] Patent Number: 5,055,976

[45] Date of Patent: Oct. 8, 1991

[54] STROBE FLASHING DEVICE

[75] Inventor: Akihiro Arai, Tokyo, Japan

[73] Assignee: Asahi Kogaku Kogyo Kabushiki Kaisha, Tokyo, Japan

[21] Appl. No.: 585,517

[22] Filed: Sep. 20, 1990

[30] Foreign Application Priority Data

Sep. 21, 1989 [JP] Japan .............................. 1-110726[U]

[51] Int. Cl.$^5$ .............................................. G03B 15/02
[52] U.S. Cl. ..................................... 362/17; 362/223; 362/309; 362/334; 362/340
[58] Field of Search .................... 362/16, 17, 223, 308, 362/311, 328, 333, 339, 309, 334, 340

[56] References Cited

U.S. PATENT DOCUMENTS

| | | | |
|---|---|---|---|
| 4,136,379 | 1/1979 | Chevali | 362/16 X |
| 4,234,906 | 11/1980 | Schindler | 362/333 X |
| 4,412,276 | 10/1983 | Blinow | 362/16 X |

FOREIGN PATENT DOCUMENTS 1-21294 6/1989 Japan .

Primary Examiner—Stephen F. Husar
Attorney, Agent, or Firm—Sandler, Greenblum, & Bernstein

[57] ABSTRACT

A strobe flashing device having a cylindrical strobe light emitting tube and a condenser lens for gathering light beams emitted from the strobe light emitting tube. The condenser lens is provided on one side face with a first cylindrical lens which gathers light beams only in a direction that is parallel with the longitudinal axis of the strobe light emitting tube. A second side face of the condenser lens is provided with a second cylindrical lens which gathers light beams only in a direction that is perpendicular to a longitudinal axis of the strobe light emitting tube. At least one of the cylindrical lenses on the side faces of the condenser lens is made planar at a center portion thereof. The cylindrical lenses can be a modified cylindrical lenses having different lens curvatures that vary in accordance with an image height from a center thereof.

13 Claims, 7 Drawing Sheets

Fresnel Lens Data (elongated prism 16a)

| image height y(:mm) | 0.0 | 0.5 | 1.0 | 1.5 | 2.0 | 2.5 | 3.0 | 3.5 | 4.0 | 4.5 | 5.0 | 5.5 |
|---|---|---|---|---|---|---|---|---|---|---|---|---|
| prism angle α (°) | 0 | 2.3 | 4.6 | 6.9 | 9.2 | 11.3 | 13.4 | 15.5 | 17.4 | 19.3 | 21.0 | 22.7 |

```
0 ALL TOTAL = 720
1  +  TOTAL = 205
2  *  TOTAL = 316
3     TOTAL = 199
[DEG] SUM
``` emission angle (°)

```
-40.00
-38.00
-36.00
-34.00
-32.00
-30.00   1                                                                          *1
-28.00  11                                                              *8
-26.00  47                                                         *10
-24.00  33                                                    *9
-22.00  23                                           *2    *4
-20.00  25                                                *11
-18.00  24                                     *1    *4
-16.00  32                                     *9
-14.00  23                                     *8
-12.00  26                                     *7
-10.00  20                                     *6
- 8.00  23                                     *6
- 6.00  21                                     *5        → image height (y)
- 4.00  17                                     *5
- 2.00  25  4+4                                *5
  0.00  18  3+5                                *4    *1
  2.00  25  4+4   3+3                          *2    *4
  4.00  17        4+4                                *4
  6.00  21        4+5   1+1                          *4    *1
  8.00  23        1+2   4+4                          *2    *4
 10.00  20              4+5   1                            *4
 12.00  26              2+3   4+4                          *2    *4
 14.00  23                    4+5   1                            *4    *1
 16.00  32                    2+4   4+4                          *2    *5    *2
 18.00  24                          4+5   2+1                          *2    *5
 20.00  25                                1+2   5+5   1
 22.00  23                                      2+5   5+4   1
 24.00  33                                            3+5   5+5   3    1          2
 26.00  47                                                  1+4   4+7  6+5   5+1  4
 28.00  11                                                        +1   +2
 30.00   1
 32.00
 34.00
 36.00
 38.00
 40.00
```

0   0.5   1.0   1.5   2.0   2.5   3.0   3.5   4.0   4.5   5.0   5.5

Planar Glass 14' Data

| image height y(:mm) | 0.0 | 0.5 | 1.0 | 1.5 | 2.0 | 2.5 | 3.0 | 3.5 | 4.0 | 4.5 | 5.0 | 5.5 |
|---|---|---|---|---|---|---|---|---|---|---|---|---|
| prism angle α (0) | 0 | 0 | 0 | 0 | 0 | 0 | 0 | 0 | 0 | 0 | 0 | 0 |

0 ALL TOTAL = 720
1 + TOTAL = 205
2 * TOTAL = 316
3   TOTAL = 199
[DEG] SUM

| emission angle (°) | SUM | | | | | | | | | | | |
|---|---|---|---|---|---|---|---|---|---|---|---|---|
| -40.00 | 37 | | | | | | | | | | | |
| -38.00 | 9 | | | | | | | | | | | |
| -36.00 | 10 | | | | | | | | | | | |
| -34.00 | 12 | | | | | | | | | | | |
| -32.00 | 13 | | | | | | | | | | | |
| -30.00 | 11 | | | | | | | | | | | |
| -28.00 | 13 | | | | | | | | | | | |
| -26.00 | 12 | | | | | | | | | | | |
| -24.00 | 11 | | | | | | | | | | | |
| -22.00 | 12 | | | | | | | | | | | |
| -20.00 | 13 | | | | | | | | | | *5 | *1 |
| -18.00 | 18 | | | | | | | | | *2 | *10 | *3 | |
| -16.00 | 27 | | | | | | | | *3 | *11 | | | |
| -14.00 | 26 | | | | | | | | *11 | | | | |
| -12.00 | 23 | | | | | | | | *3 | | | | |
| -10.00 | 23 | | | | | | | *7 | | | | | |
| -8.00 | 21 | | | | | | | *8 | | | | | |
| -6.00 | 21 | | | | | | | *8 | | | | | |
| -4.00 | 19 | | | | | | | *6 | | →image height(y) | | | |
| -2.00 | 20 | 4+4 | | | | | | *6 | | | | | |
| 0.00 | 18 | 3+5 | | | | | | *5 | | | | | |
| 2.00 | 20 | 4+4 | 1 | | | | | *5 | | | | | |
| 4.00 | 19 | | 3+5 | | | | | *5 | | | | | |
| 6.00 | 21 | | 5+4 | | | | | *4 | | | | | |
| 8.00 | 21 | | 3+5 | | | | | *4 | *1 | | | | |
| 10.00 | 23 | | | 5+4 | | | | *4 | | | | | |
| 12.00 | 23 | | | 3+5 | | | | *4 | | | | | |
| 14.00 | 26 | | | 3+4 | 2 | | | *3 | | | | | |
| 16.00 | 27 | | | | 3+5 | | | *3 | *1 | | | | |
| 18.00 | 18 | | | | 4+4 | | | *4 | | | | | |
| 20.00 | 13 | | | | 2+4 | 3+1 | | *3 | | | | | |
| 22.00 | 12 | | | | | 4+4 | | *3 | *1 | | | | |
| 24.00 | 11 | | | | | 3+5 | | *3 | | | | | |
| 26.00 | 12 | | | | | +1 | 4+3 | *4 | | | | | |
| 28.00 | 13 | | | | | | 5+5 | | *2 | *1 | | | |
| 30.00 | 11 | | | | | | +3 | 3+1 | *4 | | | | |
| 32.00 | 13 | | | | | | | 5+5 | *3 | | | | |
| 34.00 | 12 | | | | | | | 1+3 | 3+1 | *4 | | | |
| 36.00 | 10 | | | | | | | | 3+4 | *3 | | | |
| 38.00 | 9 | | | | | | | | 1+4 | 3+1 | | | |
| 40.00 | 37 | | | | | | | | | 4+7 | 7+7 | 5+1 | 6 |

0  0.5  1.0  1.5  2.0  2.5  3.0  3.5  4.0  4.5  5.0  5.5

Modified Fresnel Lens Data (elongated prism 16a) Fig. 8
| image height y(:mm) | 0.0 | 0.5 | 1.0 | 1.5 | 2.0 | 2.5 | 3.0 | 3.5 | 4.0 | 4.5 | 5.0 | 5.5 |
|---|---|---|---|---|---|---|---|---|---|---|---|---|
| prism angle $\alpha$ (°) | 0 | 4.3 | 9.0 | 11.5 | 13.5 | 15.0 | 14.5 | 16.5 | 21.0 | 20.5 | 20.5 | 20.5 |
```
0  ALL TOTAL = 720
1  +   TOTAL = 205
2  *   TOTAL = 316
3      TOTAL = 199
[DEG] SUM
```
| emission angle (°) | SUM | 0.0 | 0.5 | 1.0 | 1.5 | 2.0 | 2.5 | 3.0 | 3.5 | 4.0 | 4.5 | 5.0 | 5.5 |
|---|---|---|---|---|---|---|---|---|---|---|---|---|---|
| -40.00 | | | | | | | | | | | | | |
| -38.00 | | | | | | | | | | | | | |
| -36.00 | | | | | | | | | | | | | |
| -34.00 | | | | | | | | | | | | | |
| -32.00 | | | | | | | | | | | | | |
| -30.00 | | | | | | | | | | | | | |
| -28.00 | 17 | | | | | | | | | | *2 | *8 | *1 |
| -26.00 | 31 | | | | | | | | | | *8 | *8 | |
| -24.00 | 29 | | | | | | | | | | *5 | | |
| -22.00 | 30 | | | | | | | | *5 | | | | |
| -20.00 | 26 | | | | | | | | *11 | | | | |
| -18.00 | 21 | | | | | | | *4 | *1 | | | | |
| -16.00 | 27 | | | | | | | *8 | | | | | |
| -14.00 | 25 | | | | | | | *8 | | | | | |
| -12.00 | 21 | | | | | | | *7 | | | | | |
| -10.00 | 22 | | | | | | | *6 | | | | | |
| -8.00 | 22 | | | | | | | *5 | | | | | |
| -6.00 | 30 | | | | | | | *6 | | | | | |
| -4.00 | 21 | | | | | | | *4 | | | | | |
| -2.00 | 25 | 4+4 | | | | | | *5 | | | | | |
| 0.00 | 26 | 3+5 | 1+1 | | | | | *5 | *2 | | | | |
| 2.00 | 25 | 4+4 | 4+4 | | | | | *4 | | | | | |
| 4.00 | 21 | | 4+5 | 2+1 | | | | *4 | *1 | | | | |
| 6.00 | 30 | | 3+4 | 4+5 | | | | *4 | *4 | | | | |
| 8.00 | 22 | | | 4+5 | 2+1 | | | *1 | *4 | | | | |
| 10.00 | 22 | | | 1+2 | 4+5 | | | | *2 | *2 | | | |
| 12.00 | 21 | | | | 4+4 | 2 | | | | *4 | | | |
| 14.00 | 25 | | | | 1+3 | 4+5 | | | | *4 | | | |
| 16.00 | 27 | | | | | 4+5 | 3+2 | | | | *5 | | |
| 18.00 | 21 | | | | | +1 | 5+5 | | | | *3 | *2 | |
| 20.00 | 26 | | | | | | 1+4 | 3+1 | 1 | | | *5 | |
| 22.00 | 30 | | | | | | | 5+5 | 3+1 | 6+5 | | | |
| 24.00 | 29 | | | | | | | 1+3 | 4+6 | +3 | 5+2 | | |
| 26.00 | 31 | | | | | | | | +2 | | 2+5 | 5+1 | |
| 28.00 | 17 | | | | | | | | | | | | 6 |
| 30.00 | | | | | | | | | | | | | |
| 32.00 | | | | | | | | | | | | | |
| 34.00 | | | | | | | | | | | | | |
| 36.00 | | | | | | | | | | | | | |
| 38.00 | | | | | | | | | | | | | |
| 40.00 | | | | | | | | | | | | | |
→ image height(y)
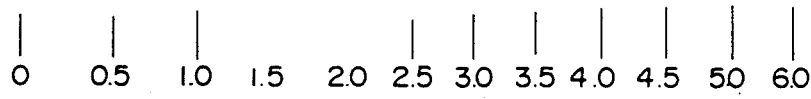
0   0.5   1.0   1.5   2.0   2.5   3.0   3.5   4.0   4.5   5.0   6.0

STROBE FLASHING DEVICE

BACKGROUND OF THE INVENTION

1. Field of the Invention

The present invention relates to a strobe flashing device used in a camera or the like, and more precisely, to a strobe flashing device having an increased light gathering (condensing) efficiency.

2. Description of Related Art

A strobe flashing device usually has a cylindrical stroboscopic tube which emits light towards an object to be taken through a reflector and a condenser lens. A spherical lens or a Fresnel lens, optically equivalent thereto, has been used as a condenser lens.

However, the spherical condenser lens has a reduced light condensing (gathering, or collecting) efficiency, in view of a cylindrical stroboscopic light emitting tube. Namely, since the light emission distribution of the stroboscopic light emitting tube in the longitudinal direction thereof is considerably different from that in the lateral direction perpendicular to the longitudinal direction and since the reflection shade has a semi-circular cross-section or semi-elliptical shape, if light emitted from the cylindrical stroboscopic light emitting tube is received by the spherical condenser lens which has uniform gathering characteristics in all directions with respect to the light axis, the amount of light which is not made incident upon the object is increased. Furthermore, in view of the distribution of light, there is a large difference in the incident angle of the light when the light emitted from the stroboscopic light emitting tube is directly incident upon the condenser lens and when the light emitted from the stroboscopic light emitting tube is first reflected by the reflection shade and is then made incident upon the condenser lens. Under these circumstances, it is next to impossible for the simple spherical lens to affectively condense light beams.

SUMMARY OF THE INVENTION

The primary object of the present invention is to provide a strobe flashing device using a cylindrical strobe light emitting tube, which can more effectively condense light beams and which has a higher brightness (i.e., substantially larger guide number).

According to a basic concept of the present invention, a strobe flashing device comprises a condenser lens which is provided on its opposite side faces with first and second cylindrical lenses which gather (condenses) the light beams in two orthogonal directions.

The cylindrical lenses are preferably made of cylindrical Fresnel lenses, each having a group of elongated prisms, so that the prism angles of the elongated prism groups can be properly set so as to independently determine the light gathering (condensing) efficiencies thereof in the two orthogonal directions.

The center portions of the cylindrical lenses, or the cylindrical Fresnel lenses other than the circumferential portion thereof, are planar, in the present invention, since no lens function is necessary at the center portion of the condenser lens.

Preferably, the cylindrical lens which gathers the light beams in the direction parallel with the longitudinal axis of the light emitting tube has a higher (stronger) light gathering efficiency than the cylindrical lens which gathers the light beams in the direction perpendicular to the longitudinal axis of the light emitting tube to enhance the gathering efficiency.

The condenser lens can be provided with non-cylindrical lenses, or, modified cylindrical lenses having different lens curvatures or refractive indexes in accordance with the image heights from the center thereof, so that taking into account the light beams which are directly made incident upon the condenser lens and the light beams which are reflected by the reflection shade and are then made incident upon the condenser lens, a more ideal refractive index and an improved light gathering efficiency can be obtained.

BRIEF DESCRIPTION OF DRAWINGS

The invention will be described below in detail with reference to the accompanying drawings, in which.

DESCRIPTION OF PREFERRED EMBODIMENTS

Figure 1:
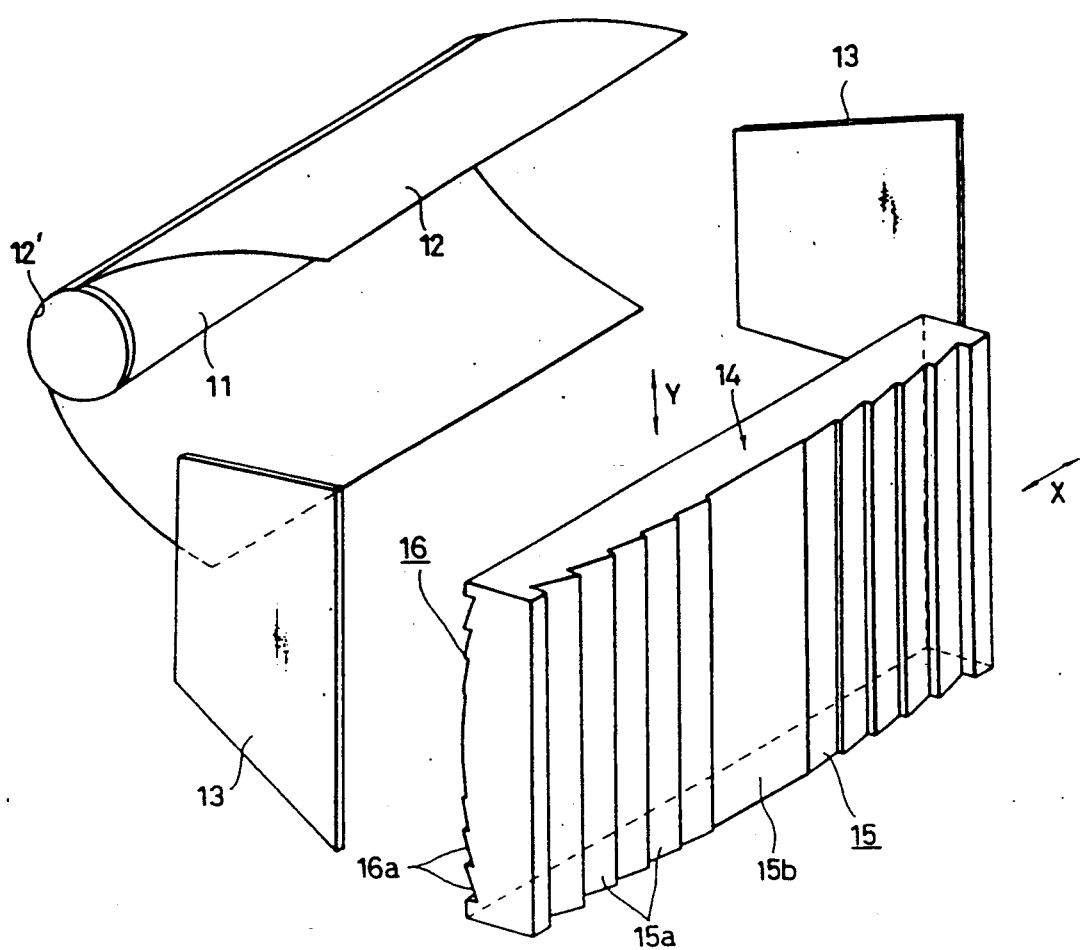
FIG. 1 is an exploded perspective view of a strobe flashing device according to an embodiment of the present invention.

FIG. 1, shows an embodiment of a strobe flashing device according to the present invention in which a cylindrical strobe light emitting tube 11 is provided on a bottom of a reflection shade 12 which has a substantially semi-elliptical or semi-circular cross section. A condenser lens 14 is provided in front of a front opening of the reflection shade 12, according to the present invention. The strobe light emitting tube 11 is provided on its opposite ends with end reflecting plates 13 which constitute a reflector, together with the reflection shade 12.

The condenser lens 14 has a rectangular shape, having longitudinal sides extending along the longitudinal axis of the strobe light emitting tube 11, as viewed from the front. The condenser lens 14 is provided on its opposite sides with first and second cylindrical Fresnel lenses 15 and 16, each having a group of elongated prisms 15a and 16a. The front prism group 15a extends in a direction that is perpendicular to the longitudinal axis of the strobe light emitting tube 11. Accordingly, the cylindrical Fresnel lens 15 collects (condenses) light beams in a longitudinal direction X of the condenser lens 14, as a whole. On the other hand, the rear prism group 16a extends in a direction that is parallel with the longitudinal axis of the strobe light emitting tube 11, so that the cylindrical Fresnel lens 16 collects (condenses) light beams in a direction Y, which is perpendicular to the longitudinal direction X of the condenser lens 14, as a whole. The angles (refraction angles, wedge angles) of the elongated prisms 15a and 16a are individually selected in such a way that the light gathering efficiency (i.e., refraction angle) of the whole cylindrical Fresnel lens 15, which has a refraction on the longitudinal sides of the condenser lens 14, is larger than that of the whole cylindrical Fresnel lens 16, which has a refraction on the short sides of the condenser lens 14.

It should be noted that in the present invention, the elongated prisms 15a are provided only at the circumferential portion of the condenser lens 14 other than the center portion thereof which is made planar, as designated by numeral 15b, since no lens function is necessary at the center portion of the condenser lens 14.

Figure 2:
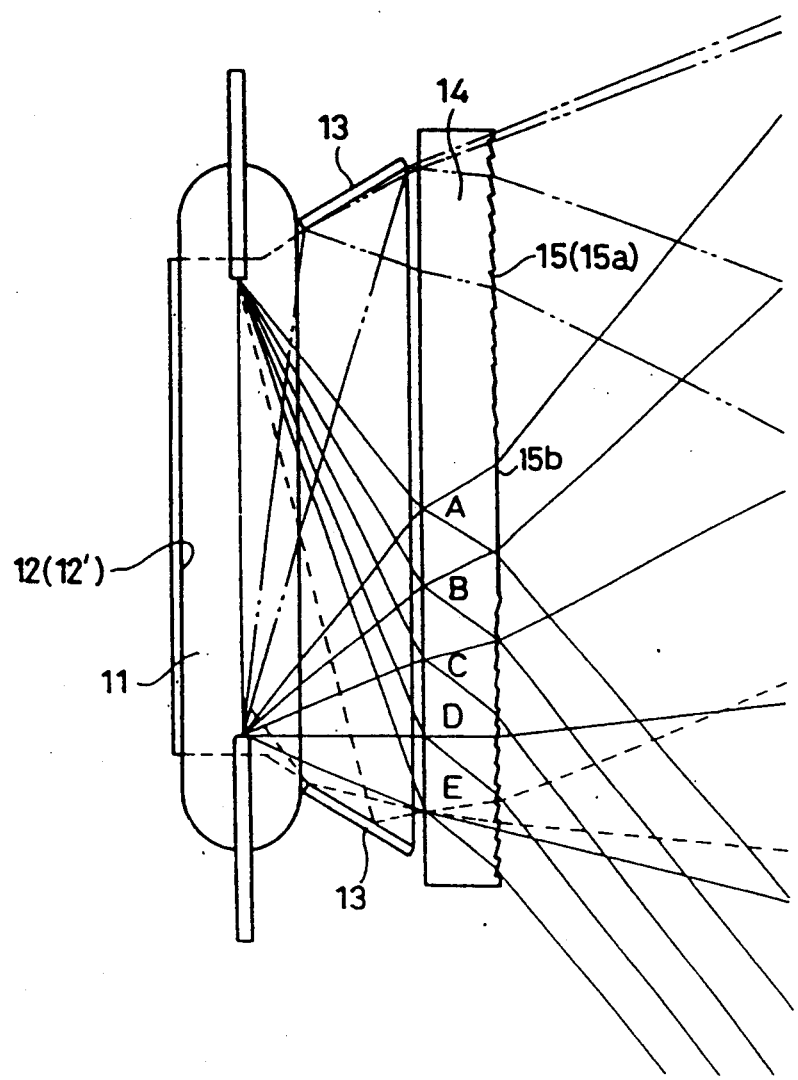
FIG. 2 is a cross sectional view of a strobe flashing device shown in FIG. 1.
Figure 3:
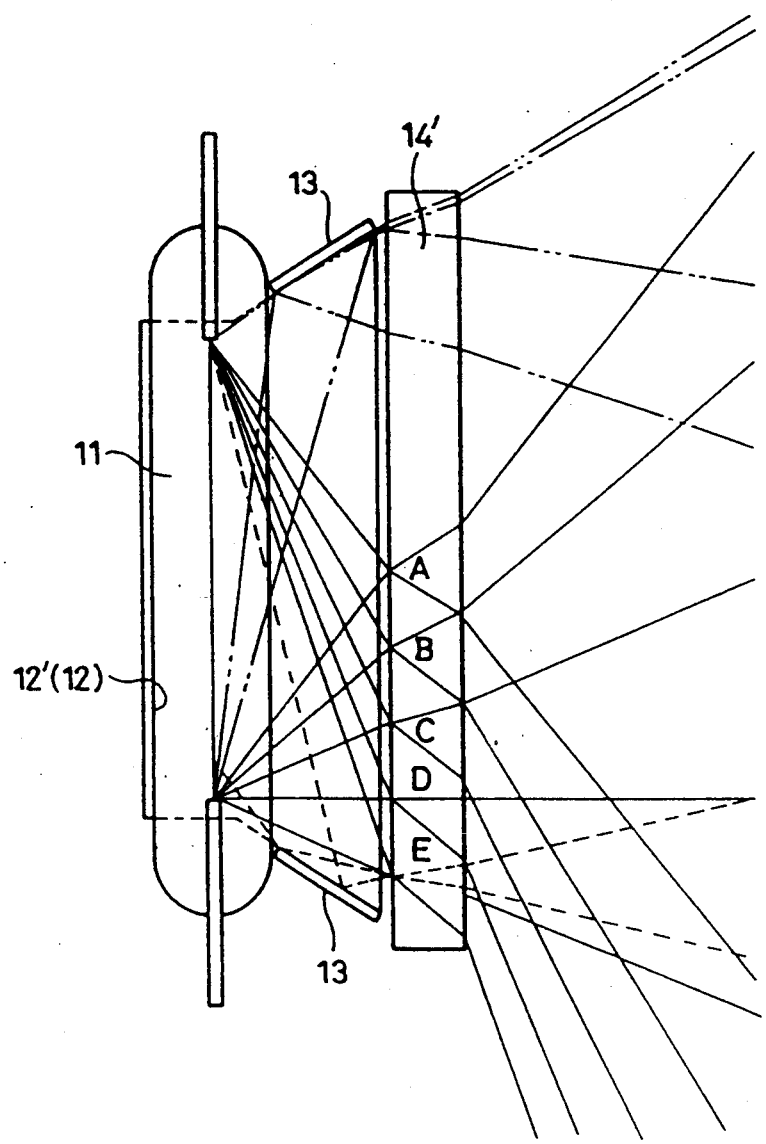
FIG. 3 is a cross sectional view similar to FIG. 2, showing a condenser lens made of a planar glass plate, only for reference.

FIG. 2 shows light beams condensed by the cylindrical Fresnel lens 15 of the condenser lens 14, in comparison with FIG. 3, in which the condenser lens 14 in FIG. 2 is replaced, for reference purposes, with a planar glass plate 14'.

In FIG. 3, presuming that critical light beams which can be made incident upon the glass plate 14' within the angle of view are light beams emitted from the terminal ends (of the light emitting area) of the strobe light emitting tube 11, light beams having a large diffusion angle are emitted from the center point A of the glass plate 14', since light beams reflected by the reflection shade 12 at almost all portions thereof reach the center point A of the glass plate 14'.

The light beams emitted from points B, C, D and E, which are gradually further away from center point A in this order, are gradually moved to an outward direction. Since the outgoing light beams are parallel with the incident light beams, the light beams emitted from points B and C are almost made incident within the necessary range (angle of view). Namely, there would be substantially no change in brightness in the view angle, even if the glass plate 14' is not provided. However, a large part of the light beams emitted from points D and E is outside the view angle. To increase the amount of light that is made incident in the angle of view, it is possible to inwardly bend the light beams emitted from points D and E. In FIGS. 2 and 3, the light beams which are reflected by the end reflecting plates 13 and are then made incident upon the planar glass plate 14' are shown as two-dotted and chained lines, and the light beams passing through points E are shown as dotted lines, respectively. Note that although only the light beams in the lower half of the planar glass plate 14' are shown in FIG. 3, the light beams appear symmetrically on the upper half thereof. The same is true in FIGS. 2, 4 and 5.

In FIG. 2 in which the condenser lens 14 includes the cylindrical Fresnel lens 15, the light beams are condensed by the cylindrical Fresnel lens 15 (elongated prisms 15a). Accordingly, the angular range of light beams emitted from the condenser lens 14 is made narrower than that of FIG. 3, so that the object within the angle of view can be effectively illuminated.

To increase the gathering efficiency, it is necessary to increase the wedge angle of the elongated prisms 15a. That is, the radius of the cylindrical lens need to be incurred. Although there is a limit to the refraction angle or the radius, the cylindrical (Fresnel) lens has a higher freedom of setting the angle of refraction than the spherical (Fresnel) lens, resulting in a realization of a more ideal condenser lens.

Figure 4:
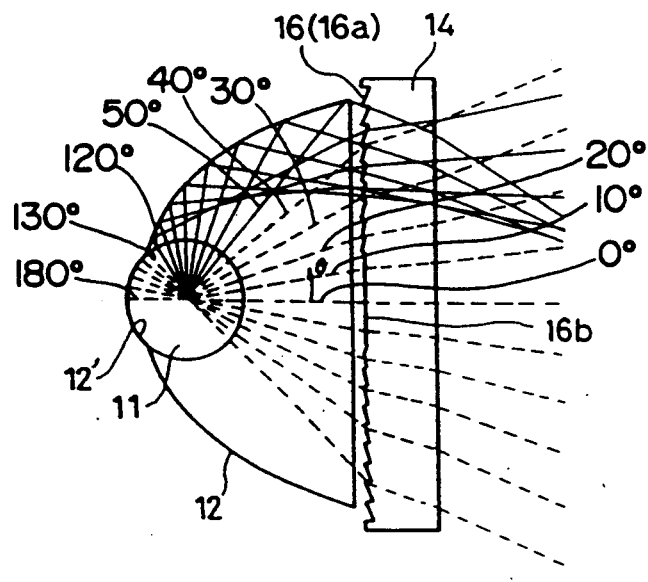
FIG. 4 is a longitudinal sectional view of a strobe flashing device shown in FIG. 1.
Figure 5:
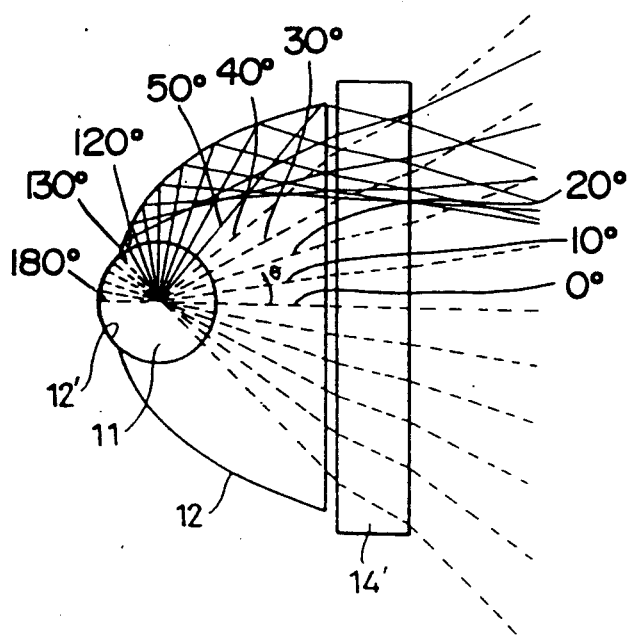
FIG. 5 is a longitudinal sectional view similar to FIG. 4, showing a condenser lens made of a planar glass plate, only for reference.

FIG. 4 shows a light gathering operation of the cylindrical Fresnel lens 16 of the condenser lens 14. FIG. 5 shows a light gathering operation of a condenser lens which, for reference is in the form of a planar glass plate 14'. FIGS. 4 and 5 show light beams emitted in the radial direction from the center portion of the strobe light emitting tube 11 at an angular distance of 10°. The reflection shade 12 is made of a reflection mirror having an elliptical cross section. In FIG. 5, the light beams within an angle of 40° from the horizontal (0°), shown as dotted lines, directly reach the planar glass plate 14' and are emitted therefrom at the same emission angles as the incident angles thereon. The light beams that are at angle of approximately 50° ~ 120° (solid lines) are reflected by the reflection shade 12 and are incident on the planar glass plate 14', so that the light beams are emitted therefrom at the same emission angles as the incident angles. The light beams that are at angle of approximately 130° ~ 180° (dotted lines) are reflected by the cylindrical mirror 12' of the back face of the light emitting tube 11, which constitutes a part of the reflection shade 12, and are transmitted through the planar glass plate 14' as substantially uniform light beams. The center of the cylindrical mirror 12' is located at the center of the light emitting tube 11.

As can be seen in FIG. 5, in particular, the light beams of 30° ~ 40° and 170° ~ 180° are emitted outside the necessary range (angle of view).

Conversely, in the arrangement shown in FIG. 4, according to the present invention, due to the light gathering operation of the cylindrical Fresnel lens 16 (elongated prisms 16a) of the condenser lens 14, the light beams which would be otherwise emitted out of the angle of view, as shown in FIG. 5, are collected within the angle of view. The cylindrical Fresnel lens (elongated prisms 16a) is provided with only the circumferential portion of the condenser lens other than the center portion thereof (16b) which is made planar, since the center portion requires no lens function, as shown in the embodiment shown in FIGS. 1 and 2.

Figure 6:
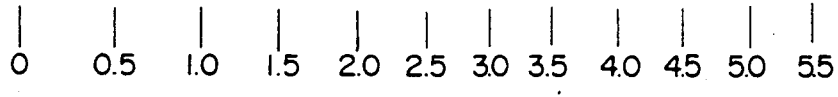
FIGS. 6 and 7 are diagrams showing examples of light distributions in arrangements shown in FIGS. 4 and 5, respectively; and, FIG. 8 is a diagram showing another example of light distribution, according to the present invention.
Figure 7:
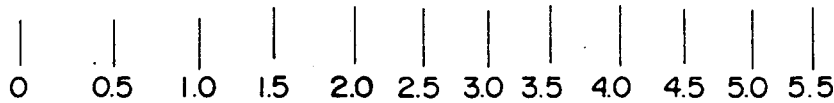

FIGS. 6 and 7 show experimental results of the distributions of the quantity of light in FIGS. 4 and 5, respectively. FIG. 8 shows experimental results of the distribution of the quantity of light in a modified Fresnel lens in which the elongated prisms 16a of the condenser lens 14 have different wedge angles.

In FIGS. 6 through 8, the ordinates represent the angle (°) of light emitted from the condenser lens 14 or the planar glass plate 14', and the abscissae represent the height (image height:y) of the condenser lens 14 or the planar glass plate 14' at which the associated outgoing light is emitted. Since the image height y is linear-symmetrical with respect to the center 0 of the condenser lens 14 or the planar glass plate 14', only a half thereof is shown.

The value marked with an *, +, or "no character" are symmetrically arranged on the graph with respect to the center 0. Accordingly, the values that fall on the center 0 are not counted twice when calculating the totals shown in FIGS. 6-8.

Data of the condenser lens 14 or the planar glass plate 14' shown on the upper portions of the drawings (FIGS. 6, 7 and 8), is represented by Fresnel lens data including the prism image height y (mm) and Fresnel angle α (°) at the corresponding prism image height.

In FIGS. 6, 7 and 8, supposing that there are 720 light beams, at an equiangular distance within 0° ~ 360°, emitted from the light emitting tube 11 in the radial direction, the number of the light beams (corresponding to the light beams of 0° ~ 40° in FIG. 4) which reach the condenser lens 14 or the planar glass plate 14' is designated with numerals without a symbol, the number of light beams (corresponding to the light beams of 50°

~120° in FIG. 4) which are reflected by the reflection shade 12 made of an elliptical mirror and reach the condenser lens 14 or the planar glass plate 14' is designated with numerals with an asterisk (*), and the number of light beams (corresponding to the light beams of 130° ~180° in FIG. 4) which are reflected by the cylindrical mirror 12' and which reach the condenser lens 14 or the planar glass plate 14' is designated with numerals with symbol (+), respectively.

The ordinates of FIGS. 6 through 8 also represent the total number of light beams for every emission angle thereof on the right side of the emission angle. The focal length of the Fresnel lens 16 in FIG. 6 is 25 mm.

Supposing that the focal length of a camera using 35 mm film is 35 mm (f=35 mm), the necessary illumination angle in the vertical direction is ±22°, as designated by horizontal lines in FIGS. 6 through 8. There are many light beams which are out of the illumination angle in FIG. 7, which corresponds to FIG. 5. Conversely, in FIG. 6, which corresponds to FIG. 4, the number of light beams which are not contained in the illumination angle is reduced. Namely, in FIG. 6, there are more light beams which are contained within the illumination angle of ±22° than that in FIG. 7. In particular, the light beams at the high image height are inwardly refracted, so that the amount of light in the circumferential portion can be increased to increase the brightness as a whole.

In FIGS. 4 and 6, the cylindrical Fresnel lens 16 of the condenser lens 14 has a constant curvature.

FIG. 8 shows a modified embodiment, in which a non-cylindrical Fresnel lens is used to obtain a better distribution of the quantity of light. In the non-cylindrical Fresnel lens, the wedge angles of the elongated prisms 16a are modified. Namely, in the modified Fresnel lens (non-cylindrical Fresnel lens), the lens curvature, or, the angle of refraction; are varied in accordance with the image height from the center, in such a way that the elongated prisms 16a have a larger magnification (refractive index) at the center portion and the vicinity thereof, and a substantially constant Fresnel angle α (refractive index) at the circumferential portion thereof. That is, as can be seen from the lens data shown in FIG. 8, the variation of the Fresnel angle α of the elongated prisms 16a at the center portion and the vicinity thereof is larger than that at the circumferential portion. In this modified Fresnel lens, the number of light beams that are made incident on the image heights is made more uniform than in FIG. 6, resulting in a realization of a brighter strobe.

Although the above discussion has been directed to light beams in a direction that is perpendicular to the longitudinal axis of the strobe light emitting tube 11, it can be similarly applied to light beams in a longitudinal direction. Namely, a brighter strobe having a uniform amount of light can be obtained by properly designing the cylindrical Fresnel lens 16 (elongated prisms 16a), as mentioned above.

Note that the present invention is not limited to the embodiments mentioned above and illustrated in the drawings.

For instance, although the illustrated embodiments are directed to a strobe device having a fixed illumination angle, it can be applied to a strobe device having a variable illumination angle, in which the illumination angle can be varied by changing the distance between the Fresnel lens and the light emitting unit comprising the light emitting tube and the reflection shade to obtain an optimum Fresnel angle at the associated distance.

What is claimed:

1. A strobe flashing device, comprising a cylindrical strobe light emitting tube and a condenser lens for gathering light beams emitted from said strobe light emitting tube, wherein, said condenser lens is provided on one side face with a first cylindrical lens which gathers said light beams only in a direction that is parallel with a longitudinal axis of said strobe light emitting tube, and on a second side face with a second cylindrical lens which gathers light beams that are only in a direction that is perpendicular to said longitudinal axis of said strobe light emitting tube, at least one of said cylindrical lenses on opposite side faces of said condensed lens being planar at a center portion thereof.

2. A strobe flashing device according to claim 1, wherein said first and second cylindrical lenses are provided on a front side face and a rear side face of said condenser lens, respectively.

3. A strobe flashing device according to claim 2, wherein said first cylindrical lens has a larger refractive index than that of said second cylindrical lens.

4. A strobe flashing device according to claim 1, wherein at least one of said first and second cylindrical lenses comprises a cylindrical Fresnel lens having a group of elongated prisms.

5. A strobe flashing device according to claim 4, wherein said cylindrical Fresnel lens is planar at a center portion thereof.

6. A strobe flashing device according to claim 5, wherein said cylindrical Fresnel lens comprises a modified Fresnel lens having different prism angles that vary in accordance with an image height from a center thereof.

7. A strobe flashing device according to claim 6, wherein a variation in a prism angle at said center portion of said modified Fresnel lens is larger than that at a circumferential portion other than said center portion thereof.

8. A strobe flashing device according to claim 7, wherein said first and second cylindrical lenses comprise first and second cylindrical Fresnel lenses, each lens having a group of elongated prisms, said first and second cylindrical Fresnel lenses being provided on a front side face and a rear side face of said condenser lens, respectively.

9. A strobe flashing device according to claim 8, wherein said first cylindrical Fresnel lens has a larger refractive index than that of said second cylindrical Fresnel lens.

10. A strobe flashing device, comprising:
a cylindrical strobe light emitting tube; and,
a condenser lens for gathering light beams emitted from said strobe light emitting tube,
wherein said condenser lens is provided on its opposite side faces with first and second cylindrical Fresnel lenses which gathers said light beams in two orthogonal directions,
at least one of said cylindrical Fresnel lenses on said opposite side faces of said condenser lens having a planar center portion which does not gather said light beams.

11. A strobe flashing device, comprising a cylindrical strobe light emitting tube and a condenser lens for gathering light beams emitted from said strobe light emitting tube, wherein, said condenser lens is provided on one side face with a modified cylindrical lens which gathers said light beams that are only in a direction that is parallel with a longitudinal axis of said strobe light emitting tube, a second side face having a modified cylindrical lens which gathers said light beams that are only in a direction that is perpendicular to a longitudinal axis of said strobe light emitting tube.

12. A strobe flashing device according to claim 11, wherein opposite side faces on said modified cylindrical lenses of said condenser lens have different lens curvatures that vary in accordance with an image height from a center thereof.

13. A strobe flashing device according to claim 12, wherein said variation in said lens curvature at said center portions of said modified cylindrical lenses is larger than that at circumferential portions other than said center portions.

* * * * *